United States Patent
Laaksonen et al.

(10) Patent No.: US 11,782,673 B2
(45) Date of Patent: Oct. 10, 2023

(54) CONTROLLING AUDIO OUTPUT

(71) Applicant: Nokia Technologies Oy, Espoo (FI)

(72) Inventors: Lasse Juhani Laaksonen, Tampere (FI); Jussi Leppänen, Tampere (FI); Miikka Vilermo, Siuro (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 25 days.

(21) Appl. No.: 17/522,073

(22) Filed: Nov. 9, 2021

(65) Prior Publication Data
US 2022/0164160 A1 May 26, 2022

(30) Foreign Application Priority Data
Nov. 25, 2020 (EP) .................... 20209803

(51) Int. Cl.
G06F 3/16 (2006.01)
G06F 3/01 (2006.01)
G01P 13/00 (2006.01)
H04R 1/10 (2006.01)

(52) U.S. Cl.
CPC .............. G06F 3/165 (2013.01); G01P 13/00 (2013.01); G06F 3/011 (2013.01); H04R 1/1041 (2013.01); H04R 2430/01 (2013.01)

(58) Field of Classification Search
CPC .......... G06F 3/165; G06F 3/011; G01P 13/00; H04R 1/1041; H04R 2430/01
See application file for complete search history.

(56) References Cited

U.S. PATENT DOCUMENTS

| 2009/0034748 A1 | 2/2009 | Sibbald |
| 2018/0240453 A1 | 8/2018 | Shubuya |
| 2020/0174734 A1 | 6/2020 | Gomes et al. |
| 2021/0397407 A1* | 12/2021 | Eubank ................. G06F 3/167 |

FOREIGN PATENT DOCUMENTS

EP 2953378 A1 12/2015

OTHER PUBLICATIONS

"Apple's AirPods Business Is Bigger Than You Think", Fortune, Retrieved on Nov. 8, 2021, Webpage available at : https://fortune.com/2019/08/06/apple-airpods-business/.
"AirPods Pro and AirPods Max Active Noise Cancellation and Transparency mode", Apple, Retrieved on Nov. 8, 2021, Webpage available at : https://support.apple.com/en-us/HT210643.
Extended European Search Report received for corresponding European Patent Application No. 20209803.4, dated May 3, 2021, 7 pages.

* cited by examiner

Primary Examiner — David L Ton
(74) Attorney, Agent, or Firm — Harrington & Smith

(57) ABSTRACT

An apparatus, method and computer program for controlling audio output is disclosed. The apparatus may comprise means for receiving data from one or more sensors representing one or more motion characteristics of a user and determining, based on the received data, one or more time instances associated with a sound event. The apparatus may also comprise means for controlling an active hear-through system of a wearable audio output device so as to temporarily modify, at a time of the one or more time instances, sound received by one or more input transducers associated with the active hear-through system that are output to an output transducer associated with the active hear-through system.

20 Claims, 8 Drawing Sheets

CONTROLLING AUDIO OUTPUT

FIELD

Example embodiments relate to an apparatus, method and computer program for controlling audio output from, for example, a wearable audio output device.

BACKGROUND

A wearable audio output device (hereafter "wearable audio device" or similar) may comprise one or more earbuds, earphones or headphones configured to output audio signals or data as sound waves via one or more output transducers, e.g. loudspeakers. A wearable audio device may comprise first and second earbuds, earphones or headphones, each for placement over (or partly within) a respective ear of a user. The wearable audio device may also comprise an input transducer, e.g. a microphone. Audio data may be received from a user device such as a smartphone or media player. Some wearable audio output devices comprise passive and/or active noise reduction functionality for stopping at least some ambient noise from reaching the ears of a user.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for receiving data from one or more sensors representing one or more motion characteristics of a user; determining, based on the received data, one or more time instances associated with a sound event; and controlling an active hear-through system of a wearable audio output device so as to temporarily modify, at a time of the one or more time instances, sound received by one or more input transducers associated with the active hear-through system that are output to an output transducer associated with the active hear-through system.

The determining means may be configured to determine, based on the one or more motion characteristics, one or more time instances associated with the sound event due to an impact caused by the user or object.

The sound event may be a repeating sound event due to an impact caused by the user or object.

The one or more sensors may comprise one or more inertial sensors of, or in communication with, the apparatus. The one or more sensors may comprise one or more of an accelerometer and gyroscope.

The determining means may be configured to determine the one or more time instances by means of predicting, based on a set of reference data, the one or more time instances at which the sound event will occur.

The determining means may be configured to: generate a first pattern comprising a sequence of time instances, including at least one prior time instance, when the one or more motion characteristics was associated with the sound event; compare the first pattern with a plurality of predetermined reference patterns, each reference pattern comprising a different pattern of time instances; identify the reference pattern to which the generated first pattern most closely corresponds; and determine the one or more time instances based on remaining time instances of the identified reference pattern.

The determining means may be further configured to: generate a second pattern, subsequent in time to generating the first pattern; measure a variance between the second pattern and that of the identified reference pattern; and compare the second pattern, responsive to identifying the variance measure exceeding a predetermined value, to the plurality of predetermined reference patterns to identify a different reference pattern for determining the one or more time instances.

The controlling means may be configured to temporarily mute or reduce an amplitude of sounds received by the input transducer at the one or more time instances.

The active hear-through system may be operable in first and second modes, the first mode being a feedforward mode, and the second mode being a feedback or hybrid mode, the controlling means being configured to temporarily reduce a gain associated with one of the first and second modes and to increase a gain associated with another one of the first and second modes at the one or more time instances.

The apparatus may further comprise means for outputting to the output transducer, at a time including or covering the time of the one or more time instances, a recorded sound segment to overlay the modified sound.

The apparatus may further comprise means for recording, using the one or more input transducers, the sound segment at a time preceding the one or more determined time instances.

The apparatus may further comprise means for classifying the recorded one or more sound segments into dynamic and stable types, and selecting to output only stable sound segment types at the one or more determined time instances.

The apparatus may further comprise means for identifying a transition between an unmodified sound and the recorded sound segment and applying a filtering effect at the transition.

The controlling means may be configured to control an active hear-through system of a wearable audio output device which comprises first and second earphones comprising respective first and second output transducers, the controlling means being configured to modify, at the one or more time instances, sound received by a first input transducer located on the first earphone independently from sound received by a second input transducer located on the second earphone.

The first earphone may comprise one or more first sensors for generating a first set of data representing one or more first motion characteristics, and the second earphone may comprise one or more second sensors for generating a second set of data representing one or more second motion characteristics, and the controlling means may be configured to detect, based on a difference between the first and second motion characteristics, that a sound event is associated more with the first earphone than the second headphone, and to modify sound received by the first input transducer differently from sound received by the second transducer.

The controlling means may be configured to disable, mute or reduce the amplitude of sound received by the first input transducer and output to the first output transducer relative to an amplitude of sound received by the second input transducer and output to the second output transducer.

The controlling means may be further configured to output to the first output transducer one or more sound segments received by the first input transducer at a time prior to the one or more time instances for overlaying the modified sound.

The apparatus may comprise a part of the wearable audio output device.

The wearable audio output device may comprise one or more earbuds, earphones or headphones or speakers of a headset, e.g. a virtual reality headset.

According to a second aspect, this specification describes a method, comprising: receiving data from one or more sensors representing one or more motion characteristics of a user; determining, based on the received data, one or more time instances associated with a sound event; and controlling an active hear-through system of a wearable audio output device so as to temporarily modify, at a time of the one or more time instances, sound received by one or more input transducers associated with the active hear-through system that are output to an output transducer associated with the active hear-through system.

The method may comprise determining, based on the one or more motion characteristics, one or more time instances associated with the sound event due to an impact caused by the user or object.

The sound event may be a repeating sound event due to an impact caused by the user or object.

The one or more sensors may comprise one or more inertial sensors. The one or more sensors may comprise one or more of an accelerometer and gyroscope.

The method may comprise determining the one or more time instances by means of predicting, based on a set of reference data, the one or more time instances at which the sound event will occur.

The method may comprise generating a first pattern comprising a sequence of time instances, including at least one prior time instance, when the one or more motion characteristics was associated with the sound event; comparing the first pattern with a plurality of predetermined reference patterns, each reference pattern comprising a different pattern of time instances; identifying the reference pattern to which the generated first pattern most closely corresponds; and determining the one or more time instances based on remaining time instances of the identified reference pattern.

The method may further comprise generating a second pattern, subsequent in time to generating the first pattern; measure a variance between the second pattern and that of the identified reference pattern; and compare the second pattern, responsive to identifying the variance measure exceeding a predetermined value, to the plurality of predetermined reference patterns to identify a different reference pattern for determining the one or more time instances.

Controlling may comprise temporarily muting or reducing an amplitude of sounds received by the input transducer at the one or more time instances.

The active hear-through system may be operable in first and second modes, the first mode being a feedforward mode, and the second mode being a feedback or hybrid mode, wherein controlling may comprise temporarily reducing a gain associated with one of the first and second modes and to increase a gain associated with another one of the first and second modes at the one or more time instances.

The method may further comprise outputting to the output transducer, at a time including or covering the time of the one or more time instances, a recorded sound segment to overlay the modified sound.

The method may further comprise recording, using the one or more input transducers, the sound segment at a time preceding the one or more determined time instances.

The method may further comprise classifying the recorded one or more sound segments into dynamic and stable types, and selecting to output only stable sound segment types at the one or more determined time instances.

The method may further comprise identifying a transition between an unmodified sound and the recorded sound segment and applying a filtering effect at the transition.

The method may comprise controlling an active hear-through system of a wearable audio output device which comprises first and second earphones comprising respective first and second output transducers, wherein the method comprises modifying, at the one or more time instances, sound received by a first input transducer located on the first earphone independently from sound received by a second input transducer located on the second earphone.

The first earphone may comprise one or more first sensors for generating a first set of data representing one or more first motion characteristics, and the second earphone may comprise one or more second sensors for generating a second set of data representing one or more second motion characteristics, wherein the method may comprise detecting, based on a difference between the first and second motion characteristics, that a sound event is associated more with the first earphone than the second earphone, and modifying sound received by the first input transducer differently from sound received by the second transducer.

The method may comprise disabling, muting or reducing the amplitude of sound received by the first input transducer and output to the first output transducer relative to an amplitude of sound received by the second input transducer and output to the second output transducer.

The method may comprise outputting to the first output transducer one or more sound segments received by the first input transducer at a time prior to the one or more time instances for overlaying the modified sound.

The method may be performed by an apparatus comprising a part of the wearable audio output device. The wearable audio output device may comprise one or more earbuds, earphones or headphones or speakers of a headset, e.g. a virtual reality headset.

According to a third aspect, this specification describes a computer program comprising instructions for causing an apparatus to perform at least the following: receiving data from one or more sensors representing one or more motion characteristics of a user; determining, based on the received data, one or more time instances associated with a sound event; and controlling an active hear-through system of a wearable audio output device so as to temporarily modify, at a time of the one or more time instances, sound received by one or more input transducers associated with the active hear-through system that are output to an output transducer associated with the active hear-through system.

Example embodiments may also provide any feature of the second aspect.

According to a fourth aspect, this specification describes a computer-readable medium (such as a non-transitory computer-readable medium) comprising program instructions stored thereon for performing at least the following: receiving data from one or more sensors representing one or more motion characteristics of a user; determining, based on the received data, one or more time instances associated with a sound event; and controlling an active hear-through system of a wearable audio output device so as to temporarily modify, at a time of the one or more time instances, sound received by one or more input transducers associated with the active hear-through system that are output to an output transducer associated with the active hear-through system.

According to a fifth aspect, this specification describes an apparatus comprising: at least one processor; and at least one memory including computer program code which, when executed by the at least one processor, causes the apparatus to: receive data from one or more sensors representing one or more motion characteristics of a user; determine, based on the received data, one or more time instances associated with a sound event; and control an active hear-through system of a wearable audio output device so as to temporarily modify, at a time of the one or more time instances, sound received by one or more input transducers associated with the active hear-through system that are output to an output transducer associated with the active hear-through system.

BRIEF DESCRIPTION OF DRAWINGS

Example embodiments will now be described, by way of non-limiting example, with reference to the accompanying drawings, in which.

DETAILED DESCRIPTION

Figure 1:
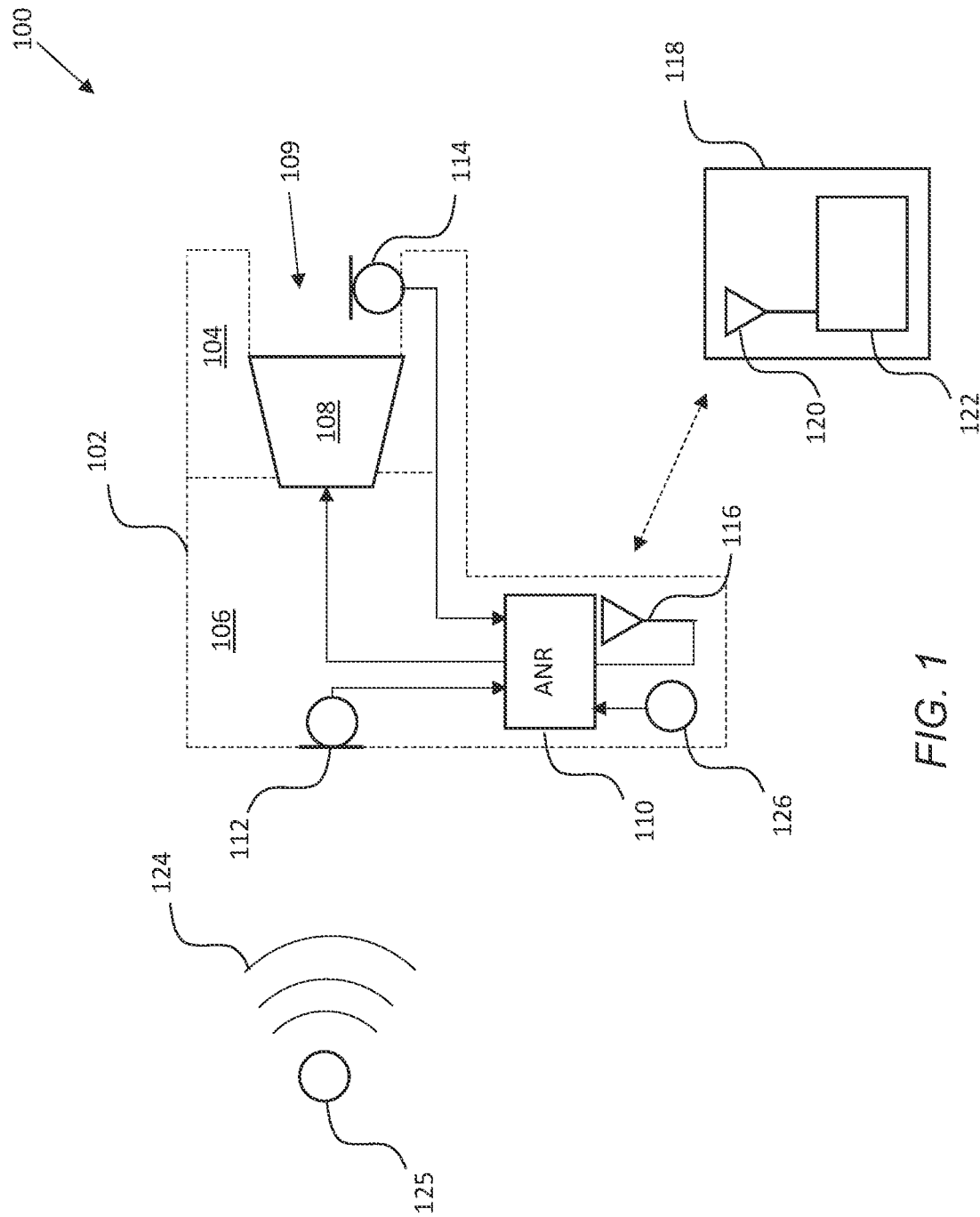
FIG. 1 is a schematic view of a system comprising a first earphone and a user device.

Example embodiments may relate to the control of audio output from a wearable audio output device which is hereafter referred to as a "wearable audio device" or similar.

A wearable audio device may be any device configured to be carried or worn by a user and capable of producing sound waves from one or more output transducers thereof. The one or more output transducers may be loudspeakers for converting electrical signals or data into audible sound waves. A wearable audio device may also comprise input functionality, such as one or more input transducers, e.g. microphones, for converting sound waves to electrical signals.

A wearable audio device may comprise one or more earbuds, earphones or headphones or speakers of a headset, e.g. a virtual reality headset.

The term "earphones device" may be used hereafter in place of "wearable audio device" as a generic term covering such above-mentioned examples or known equivalents.

An earphones device, in whichever form, may comprise only one, or more usually first and second earphones, each comprising a loudspeaker for placement over (or partly within) a respective ear of the user. An earphones device comprising only one earphone may provide monaural audio output whereas an earphones device comprising first and second earphones may provide monaural, stereoscopic or even spatialized audio output.

Example embodiments relate to an earphones device comprising first and second earphones. For the avoidance of doubt, embodiments may also be implemented in an earphones device comprising only one earphone.

An earphones device may communicate signals or data with a user device either wirelessly or through a wired connection. Wireless communications may be by means of any suitable wireless protocol such as Bluetooth, Zigbee or WiFi, e.g. using the IEEE 802.11 communications standard. In some cases, an earphones device may send audio data to a user device, for example if the earphones device comprises an input transducer such as a microphone. For example, part of a voice call may be received by a microphone of the earphones device and relayed to the user device, such as a smartphone. As another example, a voice command or query may be received by the microphone of the earphones device and relayed to the user device which may provide digital assistant functionality.

A user device may comprise any processing device capable of providing audio data to the earphones device, for example, but not limited to, a smartphone, digital assistant, digital music player, personal computer, laptop, tablet computer or a wearable device such as a smartwatch. The user device may also comprise one or more decoders for decoding the audio data into a format appropriate for output by the loudspeakers of the earphones device. The user device may also comprise one or more memory modules for storing audio data, although in some embodiments, the user device may be configured to receive streaming audio data from a remote source, e.g. via the cloud, and hence may only temporarily store the audio data. The user device may be capable of establishing a communication session with a third party via a network, e.g. an audio or videoconference or a voice call. The user device may be configured to transmit and receive data using protocols for 3G, 4G, LTE, 5G or any future generation communication protocol. The user device may comprise means for short-range communications using, for example, Bluetooth, Zigbee or WiFi. The user device may comprise a display screen and one or more control buttons. The display screen may be touch-sensitive. The user device may comprise one or more antennas for communicating with external devices, including the earphones device.

Example embodiments may relate to controlling an active hear-through system of an earphones device. An active hear-through system, in overview, may be any electrical or electronic system that permits at least some ambient sounds received by a microphone of the earphones device to be output by a loudspeaker of the earphones device. An active hear-through system may comprise a mode or function of an active noise reduction (ANR) system or circuit which will be described below.

An active hear-through mode or function may sometimes be referred to as a "transparency mode".

For context, an earphones device may comprise passive and/or active noise reduction features or functions for blocking at least some ambient sounds from reaching the ears of a user. As will be appreciated, ambient sounds from noise-producing sources which are external to the earphones device can be distracting.

Passive noise reduction features may involve using acoustically-insulating material on each earphone configured to minimize the amount of ambient sounds that reach a user's eardrum when located over or in the user's ear. Passive noise reduction features effectively plug the user's ear canals.

An ANR system is an electrical or electronic system associated with one or more microphones and one or more loudspeakers. The ANR system performs signal processing, for example by processing ambient sounds received by the one or more microphones in such a way as to generate a cancellation signal for output by the one or more loudspeakers. The cancellation signal, by means of destructive interference, acts to reduce or cancel the user's perception of the ambient sounds when it is output. For example, the ANR system may generate a cancellation signal which is in antiphase with received ambient sounds.

In an earphones device comprising first and second earphones, each earphone may comprise a microphone, an ANR system and a loudspeaker. For each earphone, the microphone of that earphone may receive ambient sound waves which are then converted to ambient sound signals and processed by the ANR system to generate the cancellation signal which is output by the loudspeaker of that earphone. Each earphone may therefore have independent ANR functionality.

Alternatively, an ANR system common to both the first and second earphones may receive the ambient sound signals from microphones of the first and second earphones and may generate respective cancellation signals for sending back to the first and second earphones. In other embodiments, the ANR system may be remote from the earphones device.

ANR systems may operate in a plurality of modes. For example, in a so-called feedforward mode, the ANR system may receive ambient sound signals via one or more microphones located on the outside or exterior of each earphone, generally on the side opposite that of the loudspeaker. In this way, the cancellation signal may be generated momentarily before the user hears the ambient sounds. For example, in a so-called feedback mode, the ANR system may receive ambient sound signals via one or more microphones located on the interior of each earphone, generally between the loudspeaker and the user's ear. In this way, the cancellation signal may be based on what the user will hear from the loudspeaker. For example, a so-called hybrid mode may utilize signals received from microphones located on the outside and inside of each earphone for producing the cancellation signal. In this way, benefits of the feedforward mode and feedback mode can be utilized to generate the cancellation signal. For example, the feedforward mode may be better at reducing or cancelling higher frequency signals compared with the feedback mode, but the latter may be better at reducing or cancelling signals across a wider range of frequencies.

A user may select which of the above ANR modes to use in a particular situation, for example via a user interface of the user device or by tapping a controller on the earphones device.

For the avoidance of doubt however, example embodiments are not limited to any particular type of ANR system or to one providing the above-mentioned modes.

ANR systems may also provide a hear-through mode, or transparency mode, mentioned briefly above. Similar to the above-mentioned other modes, the hear-through mode may be user selectable, for example via a user interface of the user device or by tapping a controller on the earphones device. A hear-through mode may be used in situations where the user wishes to hear at least some ambient sounds received via the one or more microphones of the one or more earphones. For example, when the ANR system is enabled to cancel ambient sounds in one or more of the above feedforward, feedback or hybrid modes, a user may lose track of important external sounds such as approaching traffic or speech from a nearby person. Selecting the hear-through mode therefore permits at least some ambient sounds to feed through the ANR system to the loudspeakers.

When operating in the hear-through mode, ANR functionality may remain enabled for some sounds (e.g. sounds within a particular frequency range, sounds from a particular direction and/or sounds having one or more other predetermined characteristics) whereas other sounds are fed-through. The ANR system may be selective in what sound are fed-through in the hear-through mode.

A practical issue with operating in hear-through mode is that certain unwanted sounds may be fed-through the ANR system which are distracting and/or disturbing to the user. For example, sounds which are abrupt or transient due to some impact of, for example, the user on the ground or on some surface or some other object may be fed-through. Such sounds may also be repetitive in nature, which further degrades the user experience and may prevent the user hearing important ambient sounds for which the hear-through mode was intended.

For example, as a user walks, the impact of their footsteps may generate a sequence of short, abrupt sounds that may be fed-through the ANR system when operated in the hear-through mode. For example, if part of a user's body brushes against an object, a sound may also result and be fed-through the ANR system when operated in the hear-through mode. For example, during motion, a user's arm may brush against a belt worn by the user, or a hat worn by the user may brush against one or both of the user's ears.

Example embodiments provide an apparatus, method and computer program for mitigating such unwanted effects during use of an active hear-through system based on data received from one or more sensors representing one or more motion characteristics of a user.

Example embodiments may involve determining, based on the data received from the one or more sensors, one or more time instances associated with a sound event.

Example embodiments may involve controlling an active hear-through system of a wearable audio device, such as an earphones device, so as to temporarily modify, at the time of the one or more time instances, sound received by one or more input transducers associated with the active hear-through system that are output to an output transducer associated with the active hear-through system.

For the avoidance of doubt, an active hear-through system may comprise a stand-alone system or part of an ANR system 110 configured to provide an active hear-through (or transparency) mode or functionality as described above.

In the case of the latter, example embodiments may be activated when the active hear-through mode is enabled for the ANR system, whether through user selection or some automated functionality which enables the active hear-through mode based on some detected condition.

FIG. 1 shows an example system 100 comprising a first earphone 102 and a user device 118.

The first earphone 102 may be one of a pair of earphones comprising an earphone device. Only the first earphone 102 is shown for ease of explanation. It will be appreciated that the other, second earphone of the pair may comprise the same hardware and functionality and may differ only in that it receives data/signals from the user device 118 intended for that particular earphone, e.g. its corresponding audio channel.

The earphone 102 may comprise a body comprised of an ear-insert portion 104 and an outer portion 106. The ear-insert portion 104 is arranged so as to partly enter a user's ear canal in use, whereas the outer portion 106 remains substantially external to the user's ear in use. A loudspeaker 108 may be positioned within the ear-insert portion 104 and is directed such that sound waves are emitted in use through an aperture 109 defined within the ear-insert portion, towards a user's ear. The aperture 109 may or may not be closed-off by a mesh or grille (not shown).

The earphone 102 may comprise an ANR system 110 within, for example, the outer portion 106. The ANR system 110 may comprise one or more circuits, processors, controllers, application specific integrated circuits (ASICs) or FPGAs. The ANR system 110 may operate under control of computer-readable instructions or code, which, when executed by the one or more circuits, processors, controllers, ASICs or FPGAs, may perform operations described herein. The ANR system 110 may be configured to provide conventional ANR functionality, including the hear-through mode, as described above.

The ANR system 110 may also be configured to provide additional functionality to be described below in accordance with example embodiments. Alternatively, at least some of the additional functionality may be provided by a separate system to the ANR system 110, e.g. one or more different circuits, processors, controllers, application specific integrated circuits (ASICs) or FPGAs. As such, references below to the ANR system 110 insofar as they relate to the example embodiments may be performed by a separate system.

The first earphone 102 may comprise a first microphone 112 mounted on or in the outer portion 106. One or more other "external" microphones may be mounted on or in the outer portion 106. The first microphone 112 is connected to the ANR system 110 so as to provide, in use, a feedforward signal representative of ambient sounds 124 from one or more ambient sources 125 picked-up by the first microphone.

The first earphone 102 may also comprise a second microphone 114 mounted on or in the aperture 109 of the ear-insert portion 104. One or more other "interior" microphones may be mounted on or in the aperture 109 of the ear-insert portion 104. The second microphone 114 is connected to the ANR system 110 so as to provide, in use, a feedback signal representative of ambient sounds 124 when output from the loudspeaker 108.

Provision of both first and second microphones 112, 114 is not essential and example embodiments are applicable to an earphone having either a first or second microphone 112, 114 for picking-up ambient sounds.

The first earphone 102 may comprise an antenna 116 for communicating signals with an antenna 120 of the user device 118. The antenna 116 is shown connected to the ANR system 110 which may be assumed to comprise transceiver functionality, e.g. for Bluetooth, Zigbee or WiFi communications. In some embodiments, separate transceiver functionality, e.g. a communications circuit, may be associated with the ANR system 110.

The user device 118 may also comprise one or more circuits, processors, controllers, application specific integrated circuits (ASICs) or FPGAs, generally indicated by reference numeral 122, for providing user device functionality 118 such as that of a smartphone, digital assistant, digital music player, personal computer, laptop, tablet computer or wearable device such as a smartwatch.

The first earphone 102 may also comprise one or more sensors 126 for generating data indicative of one or more motion characteristics of the user when the earphone 102 is worn by the user. This data may be referred to hereafter as "motion data". The motion characteristics indicated by the motion data may comprise any measurable motion parameter, such as acceleration, change in acceleration, orientation, direction, speed, and so on.

The one or more sensors 126 may, for example, comprise inertial sensors such as, but not limited to, one or more of an accelerometer and gyroscope. Collectively, these sensors may be provided in an inertial measurement unit (IMU) but they may be provided as separate components. An accelerometer may be configured to generate data indicative of a user's acceleration (and deceleration) during movement. A gyroscope may generate data indicative of a user's orientation and/or angular velocity. Collectively data from multiple sensors may give a more comprehensive and detailed set of motion characteristics although an accelerometer may be sufficient for demonstrating the principles of operation herein.

The motion data generated by the one or more sensors 126 may be provided to the ANR system 110 as input data.

Alternatively, or additionally, motion data may be generated by one or more sensors external to the first earphone 102 for provision to the ANR system 110. For example, one or more cameras may generate motion data indicative of a user's motion as captured in video images. For example, motion data may be generated based on detecting the position of markers worn on a user's body. For example, the user device 118 may comprise one or more sensors (not shown) for generating motion data. The user device 118 may also comprise inertial sensors as mentioned above.

Figure 2:
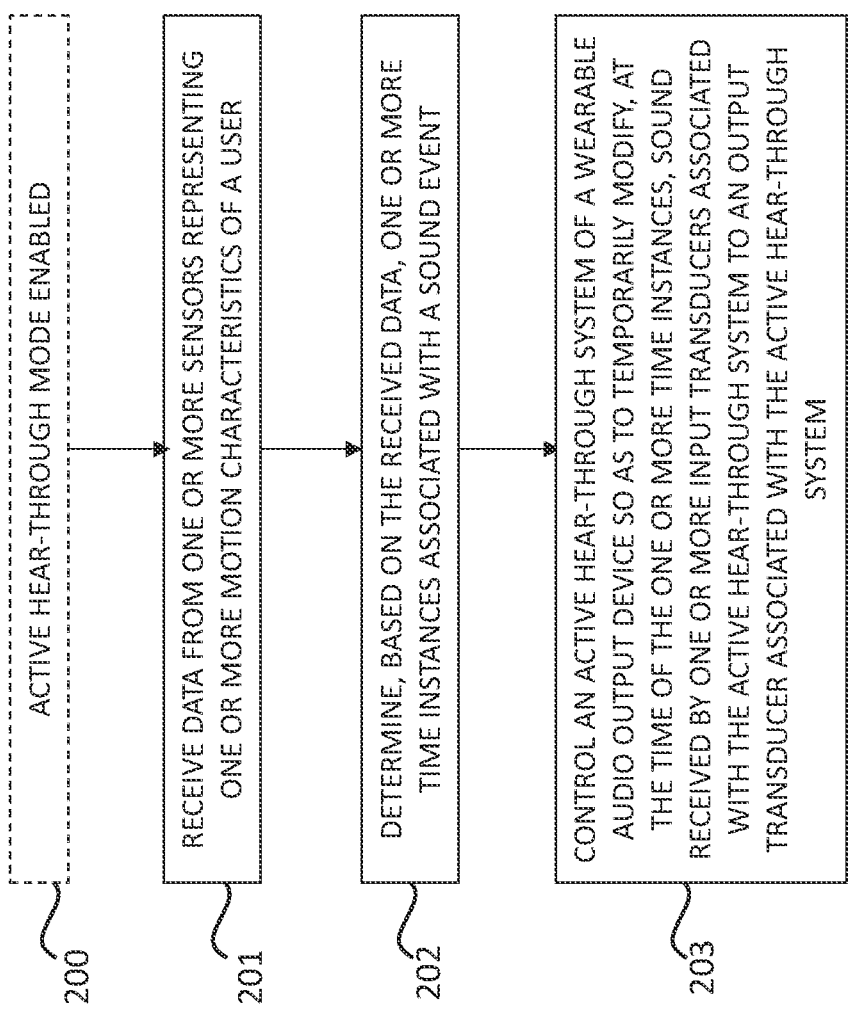
FIG. 2 is a flow diagram showing processing operations according to one or more example embodiments.

Referring to FIG. 2 a flow diagram is shown indicating processing operations that may be performed by the ANR system 110 according to one or more example embodiments.

The processing operations may be performed by hardware, software, firmware or a combination thereof.

A first operation 200, which may be optional, may comprise enabling an active hear-through mode for a wearable audio output device.

A second operation 201 may comprise receiving data from one or more sensors representing one or more motion characteristics of a user.

A third operation 202 may comprise determining, based on the received data, one or more time instances associated with a sound event.

A fourth operation 203 may comprise controlling an active hear-through system of a wearable audio output device so as to temporarily modify, at the time of the one or more time instances, sound received by one or more input transducers associated with the active hear-through system that are output to an output transducer associated with the active hear-through system.

The term "at the time of the one or more time instances" may include a time substantially at the one or more time instances, e.g. including a modification that commences just prior to the one or more time instances and which may end just after the one or more time instances. The one or more time instances may be discrete time instances, spaced apart in sequence, but their duration may vary from time to time depending on the type of sound event.

Motion characteristics may comprise any measurable motion parameter, such as acceleration, change in acceleration, direction, orientation, speed, and so on.

A sound event may be defined as an event known or assumed to produce a sound to be mitigated, e.g. because it may be disturbing. The sound event may be a discrete event that may be abrupt or transient in nature, but is not necessarily so. The sound event may be a repeating sound event, but is not necessarily so.

The third operation 202 may comprise analysis of the received motion data to predict the one or more time instances. The predicted one or more time instances may comprise the current time or one or more future times, e.g. one or more time offsets from the current time.

Figure 3:
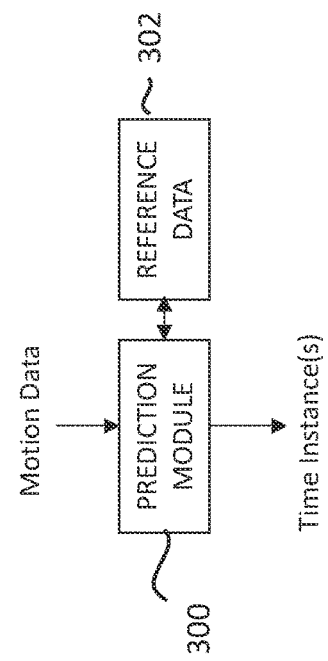
FIG. 3 is a block diagram showing a first example module for determining one or more time instances associated with a sound event according to one or more example embodiments.

For example, with reference to FIG. 3, the motion data may be input in real-time or near real-time to a prediction module 300 which may analyse current and/or a predetermined time-window of recent sensor data for comparison with a set of reference data 302. The prediction module 300 may comprise part of the ANR system 110 or may be a separate module.

The reference data 302 may be stored in a memory module of the earphone 102 or on the user device 118. The reference data 302 may be uploaded from a website, may be updated periodically based on a user training or preference-setting phase, or may be generated purely on the basis of a user training or preference-setting phase.

The reference data 302 may comprise one or more mappings which map a sound event to motion data known or predicted to produce the sound event. In this way, based on the received motion data, the prediction module 300 may predict in real-time or near real-time that the sound event will occur at one or more time instances. In some example embodiments, therefore, the one or more time instances may be determined based on sensor data not comprising audio information. In other example embodiments, audio information may be used to confirm the time instance of a sound event as predicted by the motion data.

For example, if it is known that a particular value of acceleration corresponds to a sound event, that value may be stored in the set of reference data 302 in association with identification the sound event. Rather than a particular value, the reference data 302 may indicate a particular threshold above or below which the sound event is determined to occur. Alternatively, or additionally, the reference data 302 may indicate a rate of change in acceleration that corresponds to the sound event.

Figure 4:
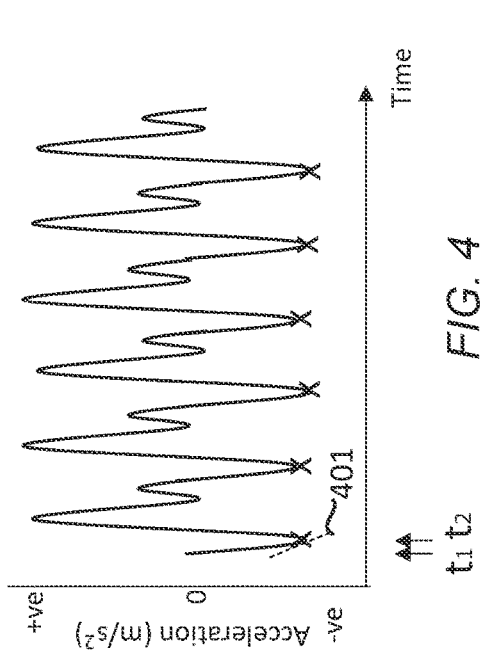
FIG. 4 is a graphical representation of a set of reference data, usable by the first example module.

For example, with reference to FIG. 4, a graph is shown indicating acceleration versus time for a typical walking motion. The "x" markings indicate known or predicted sound events due to foot impacts. It may be known that a particular change in acceleration occurs momentarily, e.g. approximately one second, prior to a user's foot impacting the ground. This is indicated in FIG. 4 by the dashed line 401 at time instance $t_1$.

The reference data 302 may store a mapping indicative that, upon detection of the particular change in acceleration indicated by the dashed line 401, the time instance $t_2$ to perform the fourth operation 203 is one second after the detection time.

In another example, the reference data 302 may indicate that the predicted time instance is the current time. For example, the reference data 302 may store a mapping indicative that, upon detection of a change from negative to positive acceleration (or a zero slope at the minimum) the time instance $t_2$ to perform the fourth operation 203 is the current time.

Being able to predict the time instance $t_2$ as a future time instance has advantages in that the whole sound event may be mitigated by means of the fourth operation 203, for example by controlling the modification to start at time before the time instance $t_2$ and ending after the time instance $t_2$ The end time may be based on knowledge of how long the sound event is likely to last, which may also be stored as part of the reference data 302 for the sound event.

The reference data 302 may store mappings for generic sound events regardless of type. For example, if the acceleration is measured above or below a predetermined threshold for greater than a predetermined amount of time, e.g. 1 second, the reference data 302 may map this condition to a sound event occurring at the current time.

Additionally, or alternatively, the mappings may be for specific sound event types. For example, if the motion data can be classified as a particular sound event type (e.g. running/walking) using, for example, a computational model of the user device 118, then the reference data 302 may indicate a sequence of future time instances as offsets from the current time.

In some embodiments, a computational model, e.g. a trained neural network, may be used as the prediction module 300. The trained neural network may be trained using generic training data or based on training data received during a supervised training phase in which the user performs certain instructed motions in order that the neural network knows, for example, by the user pressing a button or speaking a phrase at the time of the sound event, what received motion data corresponds to that sound event. The trained neural network may therefore be trained to determine the one or more time instances in a way that is tailored to the particular motions or walking characteristics of the user.

Figure 5:
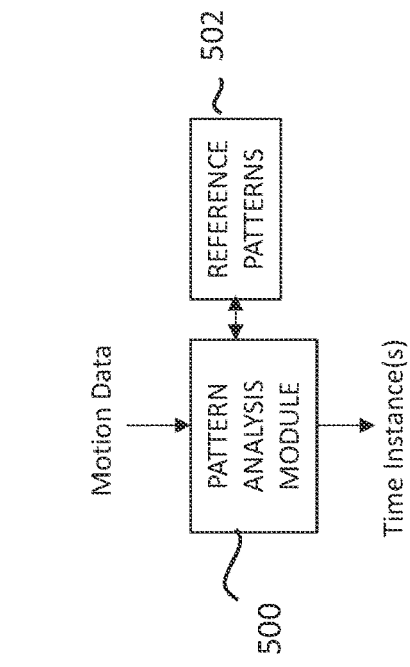
FIG. 5 is a block diagram showing a second example module for determining one or more time instances associated with a sound event according to one or more example embodiments.

As another example, with reference to FIG. 5, the motion data may be input to a pattern analysis module 500 which may generate a first pattern comprising a sequence of time instances, including at least one prior time instance, when the motion data was associated with the sound event. The pattern analysis module 500 may comprise part of the ANR system 110 or may be a separate module.

The pattern analysis module 500 may be configured to compare the first pattern with a set of predetermined reference patterns 502.

Each of the set of reference patterns 502 may comprise a different pattern of time instances, for example corresponding to different walking motions, which may differ based on characteristics such as how fast the user is walking, how tall the user is, whether the ground is inclined or flat etc.

The set of predetermined reference patterns 502 may be stored in a memory module of the earphone 102 or on the user device 118. The set of predetermined reference patterns 502 may be uploaded from a website or may be pre-configured on the earphone 102 or on the user device 118.

The pattern analysis module 500 may also be configured to identify the reference pattern to which the generated first pattern most closely corresponds, and thereafter may determine the one or more time instances as future time instances, for example based on the remaining time instances of the identified reference pattern.

Figure 6A:
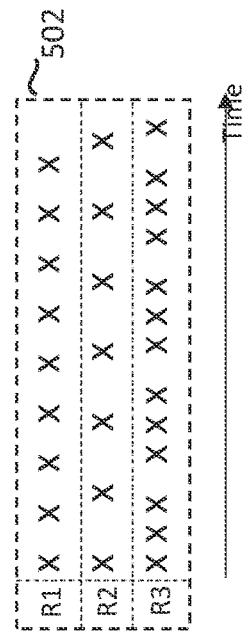
FIG. 6A is a schematic view showing a first pattern and a set of reference patterns, usable by the second example module.

With reference to FIG. 6A, an example first pattern 600 is shown comprising three time instances $T_1$, $T_2$ and $T_3$, corresponding to a sound event. The first and second time instances $T_1$, $T_2$ may have occurred in the past and the third time instance $T_3$ may correspond to the current time.

FIG. 6A also shows a set of predetermined reference patterns 502, comprising three different reference patterns R1, R2, R3. The pattern analysis module 500 may compare the first pattern 600 to the three reference patterns R1, R2, R3 and may identify that the first reference pattern R1 is the closest match.

Figure 6B:
FIG. 6B is a schematic view of a selected one of the set of FIG. 6A reference patterns.

FIG. 6B indicates the determined time instances $t_4$-$t_9$ which may correspond to the remaining time instances of the first reference pattern R1. The determined time instances $t_4$-$t_9$ may be generated as offsets from the current time.

In some example embodiments, subsequent to generating the first pattern, the pattern analysis module 500 may generate a second pattern, effectively to update the first pattern in the manner of a moving time window. The pattern analysis module 500 may measure a variance between the second pattern and that of the identified reference pattern, e.g. R1. In response to identifying that the variance measure exceeds a predetermined value, the previous process may repeat by comparing the second pattern to the set of predetermined reference patterns 502 to identify a closest match, which may or may not be a different reference pattern. In this way, temporal variations in motion can be accounted for over time.

In some example embodiments, the fourth operation 203 may comprise controlling the active hear-through system so as to temporarily mute or reduce the amplitude of sound signals received from the first and/or second microphones 112, 114 at the one or more time instances. In this way, the user may not perceive, or will have less perception of, the sound event at the one or more time instances. For example, a gain associated with sound signals received from the first and/or second microphones 112, 114 may be temporarily reduced at the one or more time instances. In this way, disturbances are not fed-through in the hear-through mode.

Figure 7:
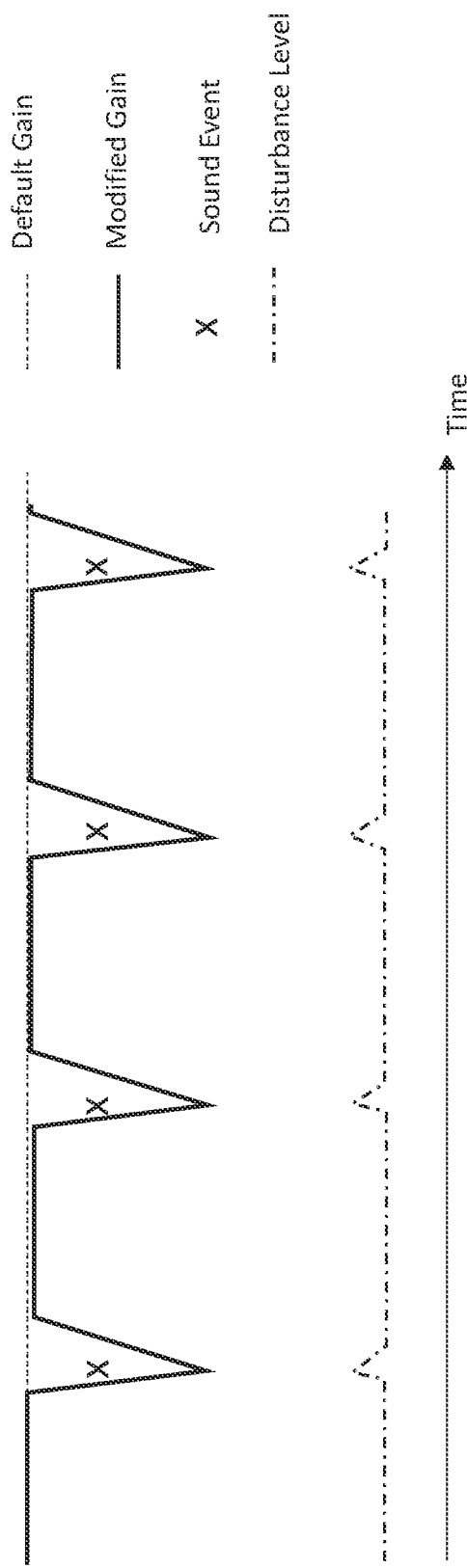
FIG. 7 is a graphical representation indicating how, at a time of one or more determined time instances, sound may be modified according to one or more example embodiments.

FIG. 7 is a graph indicative of the above example with respect to time on the horizontal axis. A default gain for, say, the first microphone 112 is indicated together with a modified gain that may be applied in the fourth operation 203 at the determined time instances. The timing of the gain modifications occur at (and may extend either side of) the determined time instances. Mitigation in disturbance level is also indicated.

It will be seen that, where the determined time instances are future time instances, the gain can be reduced shortly before each time instance and raised shortly after each time instance. A predetermined "prior" and "post" time period may be utilized, e.g. 10 ms, but can be varied based on the predicted duration of the sound event. The reduction in gain can be made faster than the subsequent raising of the gain.

In some example embodiments, the modification performed in the fourth operation 203 may comprise a gain increase rather than a decrease.

For example, in some scenarios, use of a particular mode (feedforward, feedback or hybrid) for the ARN system 110 when in the active hear-through mode may contribute to the problem.

Figure 8A:
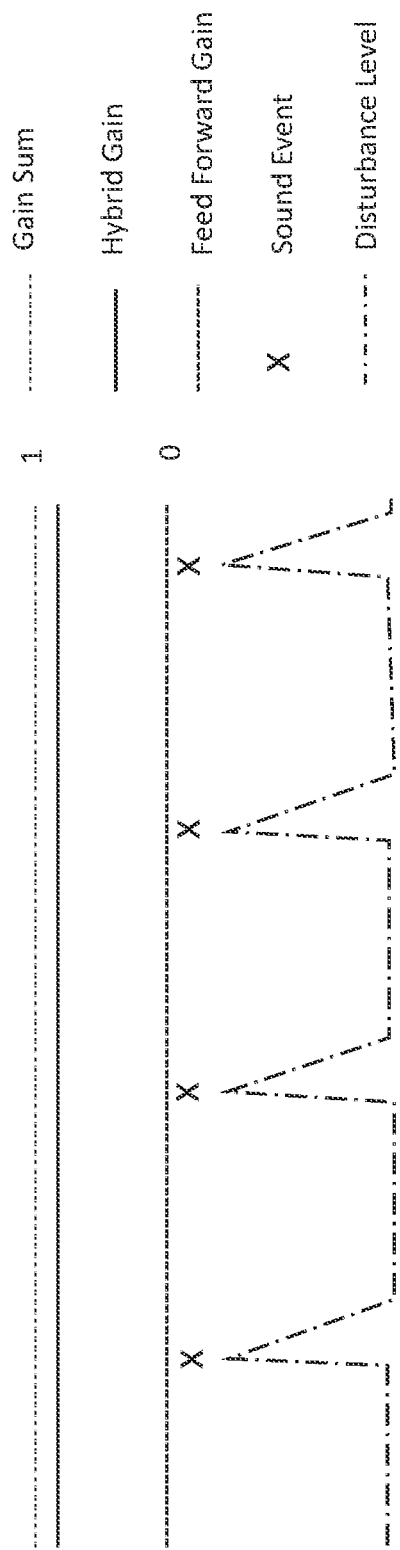
FIG. 8A is a graphical representation indicating undesirable effects that may be mitigated according to one or more example embodiments.
Figure 8B:
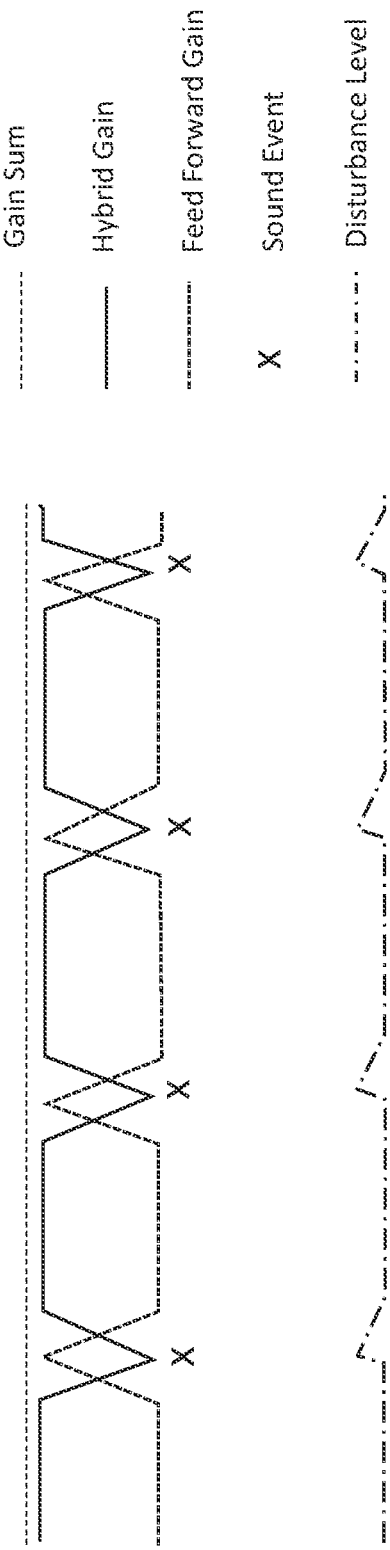
FIG. 8B is a graphical representation indicating the result of mitigating the FIG. 8A undesirable effects according to one or more example embodiments.

For example, with reference to the graph of FIG. 8A, it will be seen that a higher gain for hybrid mode processing (use of both first and second microphone signals) relative to gain for feedforward processing (use of the first microphone signal only) may not produce desirable results in terms of mitigating the disturbance level. However, with reference to FIG. 8B, it will be seen that by modifying, at the one or more determine time instances, the respective gains such that the gain associated with the hybrid mode processing is reduced and the gain associated with the feedforward mode is increased, the disturbance level can be significantly reduced.

To generalize, where the ARN system 110 operating in the active hear-through mode is operable in first and second modes, the first mode being a feedforward mode using signals received from the first microphone 112 and the second mode being a feedback or hybrid mode using, alternatively or additionally, signals received from the second microphone 114, the fourth operation may comprise temporarily reducing a gain associated with one of the first and second modes and increasing a gain associated with the other one of the first and second modes at the one or more time instances. For example, a gain associated with the feedback or hybrid mode may be reduced and the gain associated with the feedforward mode may be increased at the one or more time instances.

Put another way, there may be a switch between the first and second modes at the one or more time instances.

In some example embodiments, where the fourth operation 203 comprises controlling the active hear-through system so as to temporarily mute or reduce the amplitude of sound signals, as in the example described with reference to FIG. 7, the ANR system 110 may be configured to output a recorded sound segment at a time which includes or covers the time of the one or more determined time instances, effectively to overlay the modification.

The purpose of overlaying the modification is to improve the stability of the resulting hear-through audio perceived by the user, which may tend to give an unwanted fluctuating sound effect that also masks the wanted hear-through sounds. The recorded sound segment may be recorded by either or both of the first and second microphones 112, 114. The recording may take place within a time period preceding the one or more determined time instances, and therefore preceding the modification. In the case of a repeating sequence of sound events for which there will be a repeating set of modifications, a sound segment may be recorded for at least some of the time period between the sequential time instances, which sound segment may then be overlaid as the next modification occurs. This process is indicated graphically in FIG. 9 whereby reference numeral 800 may indicate a sound segment recorded prior to a modification, and reference numeral 802 may indicate it being overlaid at the time of the next modification.

Figure 9:
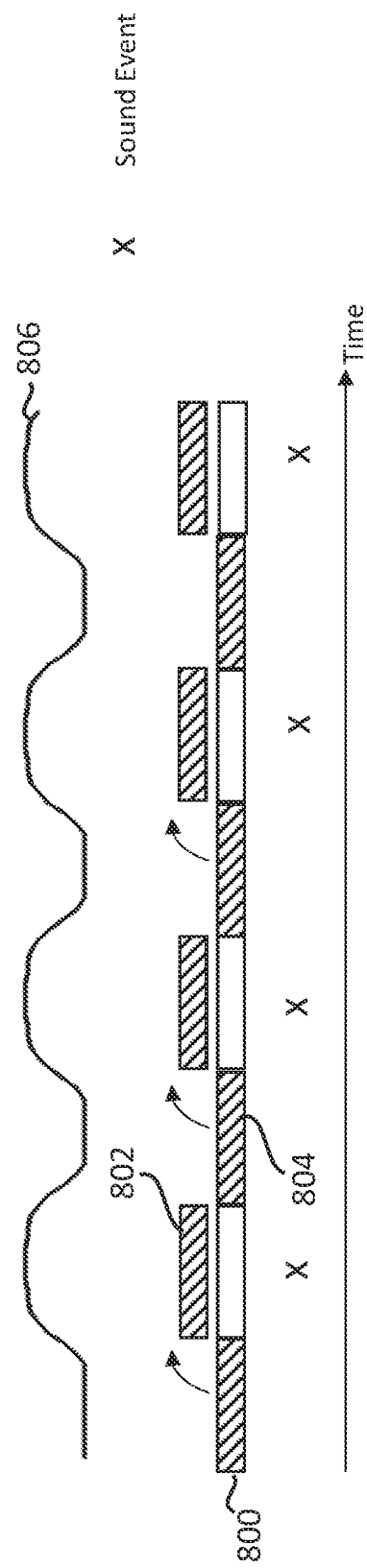
FIG. 9 is a graphical representation indicating recorded sound segments overlaid onto modified sounds at a time of one or more determined time instances.

The resulting audio comprising the unmodified and overlaid audio segments may be filtered in any known manner to smooth the transition between temporally adjacent sound segments 800, 802, as indicated by line 806 in FIG. 9, which may help reduce perception by the user of this form of processing. For example, a known filtering effect such as a low-pass filtering effect may be applied at the transition.

In some embodiments, the recorded sound segments may be analysed prior to being overlaid. For example, in a practical situation, there may be different types of ambient sounds, such as abrupt, dynamic sounds (e.g. people talking) and more diffuse and stable, noise-like sounds (e.g. traffic hum). It may be beneficial only to overlay sound segments which correspond to the diffuse and stable sounds and not the dynamic sounds. For example, if a recorded sound segment corresponds to people talking, it would create confusion to repeat words already spoken and/or which do not relate to current events. As such, example embodiments may selectively determine which recorded sound segments to overlay and which to not. For example, referring to FIG. 9, if the sound segment 800 is classified as a stable sound, then it may be overlaid as sound segment 802 at the time of the next modification. If the next sound segment 804 is classified as a dynamic sound, then there may be no overlay at the time of the next modification, or alternatively, the previous overlay sound segment 802 may be re-used.

Classification of the recorded sound segments may be by means of any suitable computational model such as a trained neural network which has been trained to classify audio data into dynamic and stable types, for example using supervised or unsupervised learning.

Figure 10:
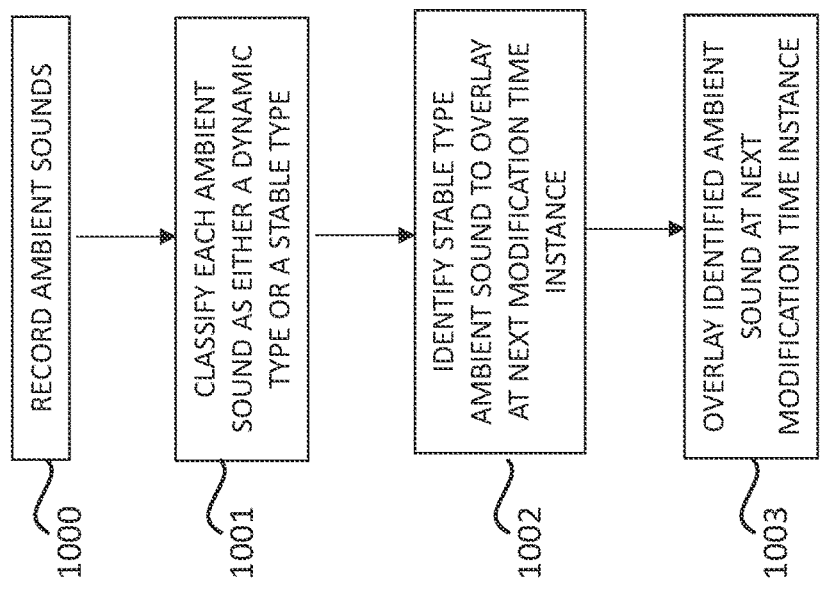
FIG. 10 is a flow diagram showing processing operations according to one or more further example embodiments.

FIG. 10 is a flow diagram indicating processing operations that may be performed by the ANR system 110 according to one or more example embodiments. The processing operations may be performed by hardware, software, firmware or a combination thereof.

A first operation 1000 may comprise recording one or more ambient sounds. The first operation 1000 may be performed prior to the next determined time instance at which a modification will occur.

A second operation 1001 may comprise classifying each recorded ambient sound as either a dynamic type or a stable type.

A third operation 1002 may comprise identifying a stable type ambient sound to overlay at the next modification time instance. For example, the identified segment may be the most recent recorded sound segment classified as stable. For example, this may also be based on a predicted or estimated length of the modification, where a long duration sound event may require an overlay sound segment which has the same or a greater duration. Other rules or logic may be applied to determine which overlay sound segment to use.

A fourth operation 1003 may comprise overlaying the identified ambient sound at the next modification time instance.

In some example embodiments, where an earphones device comprises first and second earphones, the above operations may be performed for the earphones device as a whole using input data from, for example, only one of the earphones. For example, only one of the earphones, e.g. the first earphone 102 shown in FIG. 1, may comprise the one or more sensors 126 and an ANR system 110 configured to perform the operations described above, whereby the modifications may be applied to loudspeakers of both of the first and second earphones at the determined one or more time instances. Alternatively, both the first and second earphones may comprise the one or more sensors 126 but an average of the motion data may be used by the ANR system 110 to provide the same modifications to the first and second earphones at the determined one or more time instances.

In some embodiments, the first and second earphones may comprise respective sets of one or more sensors 126 for generating respective sets of data representing one or more motion characteristics, such that motion characteristics of each earphone may be processed independently.

Figure 11A:
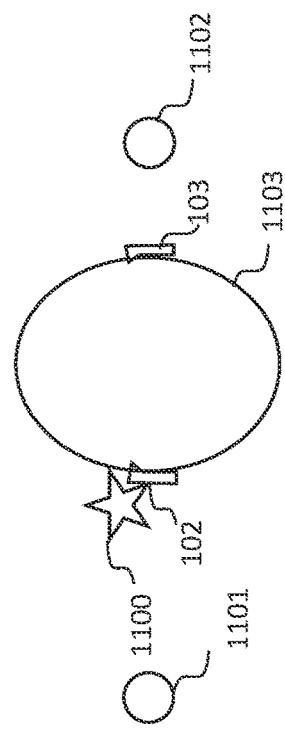
FIG. 11A is a schematic view of an earphones device comprising first and second earphones when mounted on a user's head and indicating locations of perceived ambient sounds.
Figure 11B:
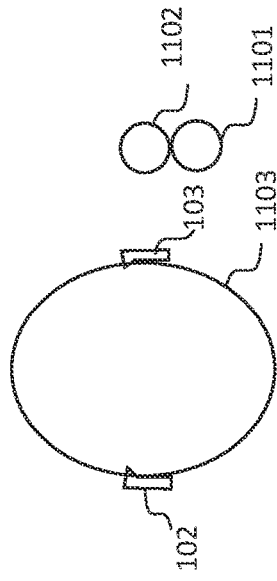
FIG. 11B is similar to the schematic view of FIG. 11A, useful for understanding the result of performing the FIG. 10 processing operations.
Figure 11C:
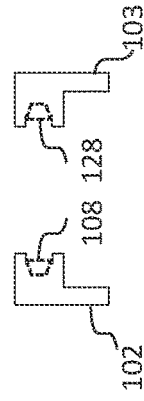
FIG. 11C is a more detailed schematic view of the FIG. 11A earphones device.

For example, with reference to FIG. 11A, there is shown a wearable audio output device which comprises first and second earphones 102, 103 shown mounted on respective right and left ears of a user's head 1103. The first earphone 102 may be considered the same or substantially the same to that shown in FIG. 1, for example. FIG. 11C shows the wearable audio output device in greater detail, the first and second earphones 102, 103 comprising respective output transducers (e.g. speakers) 108, 128 which direct sound substantially inwards towards the user's respective ears when word. The first earphone 102 may comprise one or more first sensors and the second earphone 103 may comprise one or more second sensors. At a given time, the one or more first sensors may generate a first set of motion data for the first earphone 102, representing one or more first motion characteristics, which motion data may be different from a second set of motion data for a second earphone 103 (generated by the one or more second sensors) of the same earphones device. This may occur for a one-side disturbance 1100, for example when one of the user's ears or one side of the user's head makes contact with an object, e.g. a hat overhanging one ear, or when the user rubs one side of their head. In such cases, sounds received by the one or more microphones 112, 114 of the first earphone 102 may be modified differently, i.e. independently, from sounds received by a microphone of the second earphone 103.

For example, one or more sensors of the first earphone 102 may generate first motion data representing first motion characteristics and one or more sensors of the second earphone 103 may generate second motion data representing second motion characteristics. The ANR system 110 may be configured, based on determining a difference between the first and second motion characteristics, to determine that a sound event (i.e. the disturbance 1100) is associated more with the first earphone 102 than the second earphone 103.

In such a case, the hear-through functionality for the first earphone 102 may be disabled, muted and/or reduced in terms of gain. This may involve disabling, muting and/or reducing the amplitude or gain for signals received from the one or more microphones 112, 114 of the first earphone 102. A reduction in amplitude or gain may be relative to that of the second earphone 103.

This may alternatively involve switching from a current mode (e.g. a feedforward or hybrid mode) to a different mode (e.g. a feedback mode) of processing for the first earphone 102.

The hear-through processing may continue for the second earphone 103 in accordance with operations described above. For example, the user may hear wanted ambient sounds from an ambient source 1102.

In order to mitigate effects due to the change in spatiality (due to disabling the hear-through functionality for the first earphone 102), the ANR system 110 may also be configured to output to the first earphone 102 a sound segment recorded prior to the time instance of the disturbance 1100. The sound segment may be for a wanted ambient sound 1101 that was received via the first earphone 102 and stored. This approach is similar to that described with reference to FIG. 9 in that the recorded sound segment may be output at a time which includes or covers the time of the one or more determined time instances, effectively to overlay the modified sound, e.g. modified by means of reducing the amplitude or gain. This may help maintain spatial balance. Over time, however, the balance may become less real compared with the actual sound scene around the user. Therefore, output of the recorded sound segment may be made more diffuse by filtering and/or gain reduction over time so long as the ANR system 110 continues to operate in his one-sided mode.

Alternatively, the ANR system 110 may be configured to output the above-mentioned recorded sound segment for the wanted ambient sound 1101 to the second earphone 103. This is indicated in FIG. 11B.

In all cases, the audio gains may be adjusted so as to correspond, as closely as possible, to the status before modification. Adjustments may be phased-out gradually over time.

Example Apparatus

Figure 12:
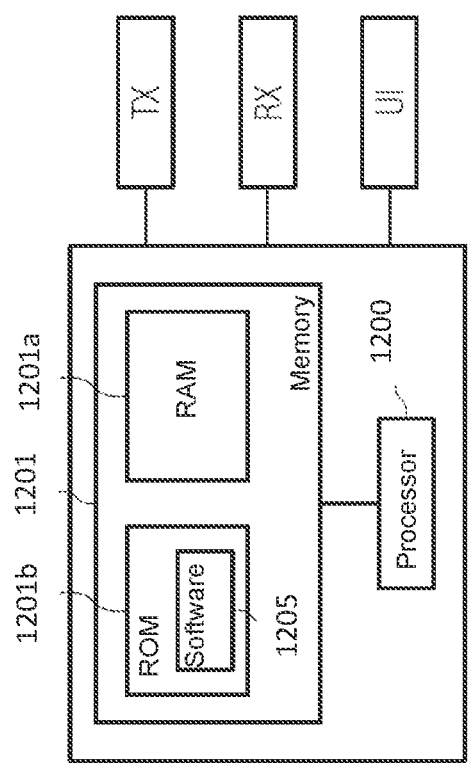
FIG. 12 is an apparatus that may be configured to perform one or more processing operations according to one or more example embodiments.

FIG. 12 shows an apparatus according to some example embodiments, which may comprise the ANR system 110 if configured to perform the operations disclosed or, if a separate apparatus is provided for performance of the operations disclosed, the FIG. 12 apparatus may comprise that separate apparatus. The apparatus may be configured to perform the operations described herein, for example operations described with reference to any disclosed process. The apparatus comprises at least one processor 1200 and at least one memory 1201 directly or closely connected to the processor. The memory 1201 includes at least one random access memory (RAM) 1201a and at least one read-only memory (ROM) 1201b. Computer program code (software) 1205 is stored in the ROM 1201b. The apparatus may be connected to a transmitter (TX) and a receiver (RX). The apparatus may, optionally, be connected with a user interface (UI) for instructing the apparatus and/or for outputting data. The at least one processor 1200, with the at least one memory 1201 and the computer program code 1205 are arranged to cause the apparatus to at least perform at least the method according to any preceding process, for example as disclosed in relation to the flow diagrams of FIGS. 2 and/or 10 and related features thereof.

Figure 13:
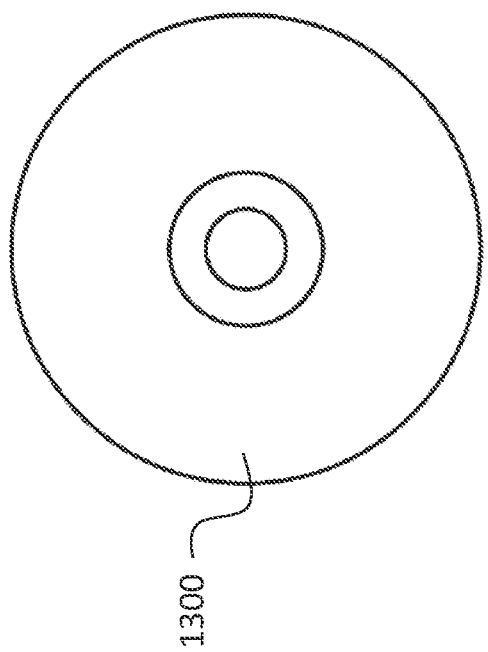
FIG. 13 is a non-transitory medium that may store computer program code for causing the FIG. 12 apparatus to perform one or more processing operations according to one or more example embodiments.

FIG. 13 shows a non-transitory media 1300 according to some embodiments. The non-transitory media 1300 is a computer readable storage medium. It may be e.g. a CD, a DVD, a USB stick, a blue ray disk, etc. The non-transitory media 1300 stores computer program code, causing an apparatus to perform the method of any preceding process for example as disclosed in relation to the flow diagrams of FIGS. 2 and/or 10 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one non-transitory memory storing instructions, that when executed by the at least one processor, cause the apparatus to:
receive data from one or more sensors representing one or more motion characteristics of a user;
determine, based on the received data, one or more time instances associated with a sound event; and
control an active hear-through system of a wearable audio output device to temporarily modify independently, at a time of the one or more time instances, sound received by input transducers associated with the active hear-through system that are output to an output transducer associated with the active hear-through system.

2. The apparatus of claim 1, wherein the determining of the one or more time instances further comprises:
determine, based on the one or more motion characteristics, one or more time instances associated with the sound event due to an impact caused by the user or an object.

3. The apparatus of claim 2, wherein the sound event is a repeating sound event due to an impact caused by the user or the object.

4. The apparatus of claim 1, wherein the one or more sensors comprise one or more inertial sensors of, or in communication with, the apparatus.

5. The apparatus of claim 4, wherein the one or more sensors comprise one or more of an accelerometer or gyroscope.

6. The apparatus of claim 1, wherein the determining of the one or more time instances further comprises:
predict, based on a set of reference data, the one or more time instances at which the sound event will occur.

7. The apparatus of claim 1, wherein the at least one non-transitory memory storing instructions is executed by the at least one processor to cause the apparatus to:
generate a first pattern comprising a sequence of time instances, including at least one prior time instance, when the one or more motion characteristics was associated with the sound event;
compare the first pattern with a plurality of predetermined reference patterns, wherein each reference pattern comprises a different pattern of the time instances;

identify the reference pattern to which the generated first pattern most closely corresponds; and determine the one or more time instances based on remaining time instances of the identified reference pattern.

8. The apparatus of claim 7, wherein the at least one non-transitory memory storing instructions is executed by the at least one processor to cause the apparatus to:

generate a second pattern, subsequent in time to the generating of the first pattern; measure a variance between the second pattern and the identified reference pattern; and compare the second pattern, responsive to an identification of the variance measure exceeding a predetermined value, to the plurality of the predetermined reference patterns to identify a different reference pattern for determining the one or more time instances.

9. The apparatus of claim 1, wherein the control of the active hear-through system further comprises: temporarily mute or reduce an amplitude of sounds received by the input transducer at the one or more time instances.

10. The apparatus of claim 1, wherein the at least one non-transitory memory storing instructions is executed by the at least one processor to cause the apparatus to: output to the output transducer, at a time including or covering the time of the one or more time instances, a recorded sound segment to overlay the modified sound.

11. The apparatus of claim 1, wherein the at least one non-transitory memory storing instructions is executed by the at least one processor to cause the apparatus to perform:

control of the active hear-through system further comprising:

control an active hear-through system of a wearable audio output device which comprises first and second earphones comprising respective first and second output transducers, the controlling being configured to modify, at the one or more time instances, sound received by a first input transducer located on the first earphone independently from sound received by a second input transducer located on the second earphone.

12. The apparatus of claim 11, wherein the first earphone comprises one or more first sensors for generating a first set of data representing one or more first motion characteristics, and the second earphone comprises one or more second sensors for generating a second set of data representing one or more second motion characteristics, the controlling means being configured to detect, based on a difference between the first and second motion characteristics, that a sound event is associated more with the first earphone than the second earphone, and to modify sound received by the first input transducer differently from sound received by the second transducer.

13. The apparatus of claim 1, comprising a part of the wearable audio output device.

14. The apparatus of claim 1, wherein the wearable audio output device is a virtual reality headset, that comprises one or more earbuds, earphones, headphones or speakers.

15. A method, comprising:

receiving data from one or more sensors representing one or more motion characteristics of a user;

determining, based on the received data, one or more time instances associated with a sound event; and controlling an active hear-through system of a wearable audio output device to temporarily modify independently, at a time of the one or more time instances, sound received by input transducers associated with the active hear-through system that are output to an output transducer associated with the active hear-through system.

16. The method of claim 15, wherein the determining of the one or more time instances comprises determining, based on the one or more motion characteristics, one or more time instances associated with the sound event due to an impact caused by the user or an object.

17. The method of claim 16, wherein the sound event is a repeating sound event due to an impact caused by the user or the object.

18. The method of claim 15, wherein the one or more sensors comprise one or more inertial sensors of, or in communication with, the apparatus.

19. The method of claim 18, wherein the one or more sensors comprise one or more of an accelerometer or gyroscope.

20. A non-transitory computer readable medium comprising program instructions stored thereon for performing at least:

receiving data from one or more sensors representing one or more motion characteristics of a user;

determining, based on the received data, one or more time instances associated with a sound event; and controlling an active hear-through system of a wearable audio output device to temporarily modify independently, at a time of the one or more time instances, sound received by input transducers associated with the active hear-through system that are output to an output transducer associated with the active hear-through system.

\* \* \* \* \*